United States Patent [19]

Van Winkle

[11] 4,392,633

[45] Jul. 12, 1983

[54] VALVE STRUCTURE HAVING MOVABLE SEAT MEANS

[76] Inventor: Denzal W. Van Winkle, 411 Yorkchester, Houston, Tex. 77079

[21] Appl. No.: 89,180

[22] Filed: Oct. 29, 1979

[51] Int. Cl.³ .................... F16K 25/00; F16K 31/12
[52] U.S. Cl. ................................ 251/122; 166/86; 251/1 A; 251/172; 251/214; 251/223; 251/DIG. 4; 403/317
[58] Field of Search ............. 251/1 A, DIG. 4, 172, 251/215, 221, 225, 326, 327, 328, DIG. 1, 223, 4, 122, 214; 403/DIG. 8, 316, 317; 137/599, 508; 277/129, 188 R, 188 A, 235 R; 166/86, 88, 324; 92/249

[56] References Cited

U.S. PATENT DOCUMENTS

| | | | |
|---|---|---|---|
| 1,038,527 | 9/1912 | Coleman | 137/508 |
| 1,631,109 | 5/1927 | Hitzemann | 137/599 |
| 1,726,302 | 8/1929 | Keema | 251/DIG. 4 |
| 1,901,979 | 3/1933 | Meusy | 251/DIG. 4 |
| 2,086,698 | 7/1937 | Carroll | 137/508 |
| 2,367,106 | 1/1945 | Dolch | 137/508 |
| 2,440,739 | 5/1948 | Conroy | 403/317 |
| 2,509,656 | 5/1950 | Tomoser | 251/172 |
| 2,524,730 | 10/1950 | Lawhon | 137/599 |
| 2,839,263 | 6/1958 | Kisling | 277/129 |
| 2,841,429 | 7/1958 | McCuistion | 251/DIG. 1 |
| 2,885,176 | 5/1959 | Bryant | 251/172 |
| 2,970,802 | 2/1961 | Ocampo | 251/172 |
| 3,071,344 | 1/1963 | Banks | 251/DIG. 4 |
| 3,132,662 | 5/1964 | Allen | 251/1 A |
| 3,233,863 | 2/1966 | Bowen et al. | 251/DIG. 4 |
| 3,258,028 | 6/1966 | Donner | 137/508 |
| 3,327,991 | 6/1967 | Wallace | 251/172 |
| 3,554,480 | 1/1971 | Rowe | 251/1 A |
| 3,744,749 | 7/1973 | Le Rouax | 251/1 A |
| 3,761,053 | 9/1973 | Bedo et al. | 251/DIG. 4 |
| 3,946,806 | 3/1976 | Meynier | 251/1 A |
| 3,975,986 | 8/1976 | Barth et al. | 92/249 |
| 4,064,904 | 12/1977 | Tolnai | 251/172 |
| 4,082,104 | 4/1978 | Keeney | 137/508 |
| 4,227,543 | 10/1980 | Williams, Jr. | 251/1 A |
| 4,240,503 | 12/1980 | Holt, Jr. et al. | 251/1 A |

FOREIGN PATENT DOCUMENTS 594175  3/1960  Canada ........................... 251/1 A Primary Examiner—George L. Walton
Attorney, Agent, or Firm—Jack W. Hayden

[57] ABSTRACT

Ram bodies mounted in transverse bores of a blowout preventer body with a longitudinal bore therethrough are operable by operating means extending through closures on one end of the transverse bores to move the rams to close off fluid communication through the longitudinal bore in the body and to retract the rams from the longitudinal bore. Removable seal means are provided on each ram body to seal with the transverse bore in which each ram body is mounted. Removable seal means extend diametrically across the front of each ram for sealingly engaging an elongate member in the longitudinal bore when the rams are closed. The removable seal means is retained in position by non-torquing means during use but may be readily replaced when necessary. Self energizing seal means on the ram body sealingly engage the transverse bores.

Valve means is incorporated in the blowout preventer body to equalize pressure in the longitudinal bore above and below the closed rams when desired, which valve means is constructed and arranged to respond to pressure below the rams to remain closed until it is desired to open the valve means.

13 Claims, 6 Drawing Figures

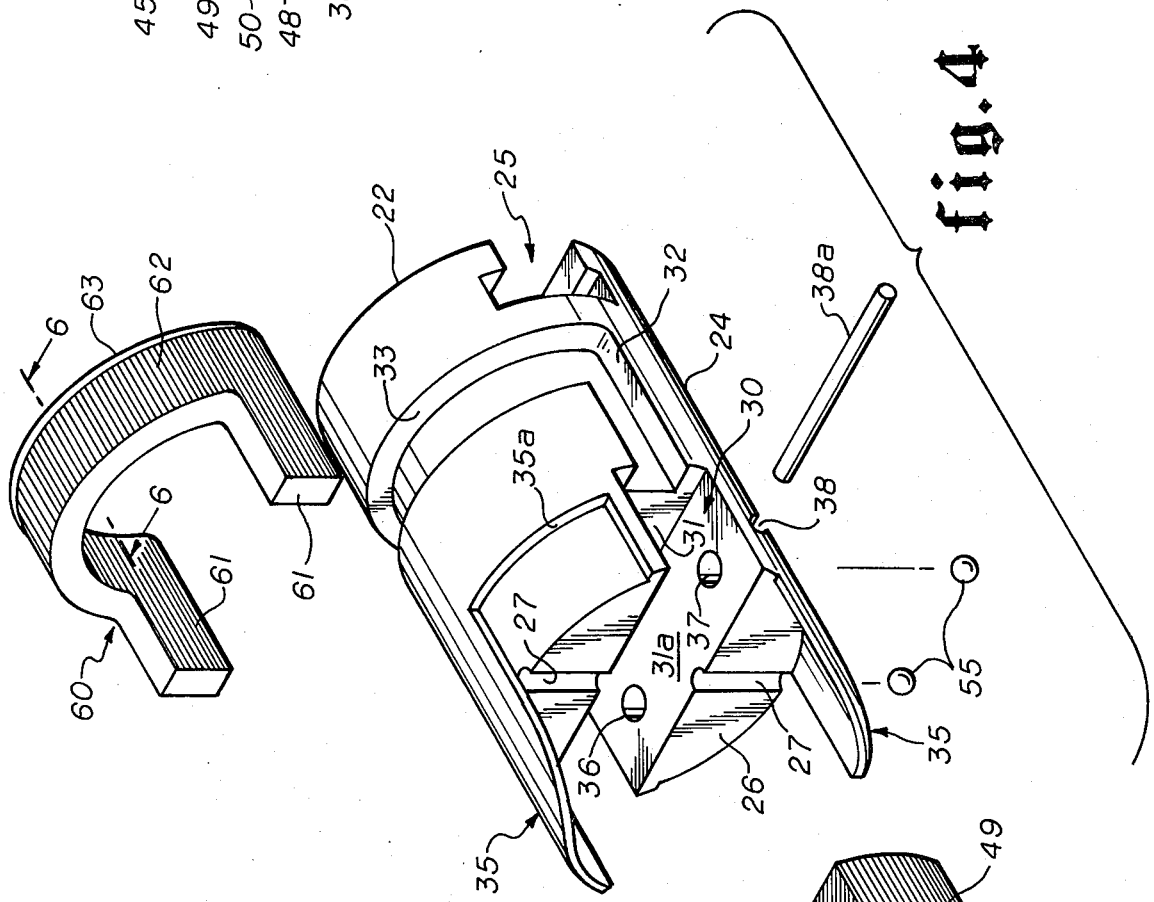

VALVE STRUCTURE HAVING MOVABLE SEAT MEANS

SUMMARY OF THE INVENTION

Various types of blowout preventers, including wireline blowout preventers has been known and are in use. For example, U.S. Pat. No. 2,839,263 is illustrative of a form of blowout preventer useable with wirelines or other elongate members to seal off therewith as various well operations are conducted. However, so far as known to applicant, seal arrangements used on the front of the rams in prior art preventers have been secured thereon in a manner so that when it becomes worn, substantial difficulty has been encountered in replacing the worn seal. Also, so far as known to applicant, no equalizing means has been provided within the preventer body to enable the pressure below the closed rams to be equalized with the pressure above the closed rams in the longitudinal bore of the preventer body which pressure equalization is desirable before opening the rams from their closed, sealably engaged position with an elongate member in the longitudinal bore.

The present invention provides a novel seal arrangement which may be easily positioned on the front of the blowout preventer rams during use, but which may be readily removed and replaced when it is necessary due to wear. The seal means are constructed and arranged so that they are self energizing to form a seal.

The present invention also contemplates the provision of equalizing valve means within the blowout preventer body to enable the pressure in the longitudinal bore beneath the rams to be equalized with the pressure in the longitudinal bore above the rams when desired, the equalizing valve including a needle valve and movable seat which is responsive to pressure to urge it into a tighter sealing engagement with the valve element on the seat thereof when it is desired to keep the valve closed. The seat is also rotatable so that it may rotate with the stem during opening and closing of the valve to thus reduce wear and galling of the valve seat and stem.

A further object is to provide a novel needle valve means wherein the valve seat is movable in relation to the valve body and in relation to the needle stem of the needle valve to reduce wear and galling between the valve seat and needle stem which seats on the valve seat.

A further object is to secure seal means to a blowout preventer ram end without the use of bolts. The securing means substantially completely eliminates the probability of its becoming loose during use and yet may be readily removed if desired when the ram is disconnected from the preventer.

Other objects and advantages of the present invention will become more apparent from a consideration of the following drawings and description.

BRIEF DESCRIPTION OF THE DRAWINGS

FIG. 4 is an exploded view illustrating one of the preventer rams and details of the removable seal arrangement;

FIG. 5 is a sectional view through the front end of a ram and the removable seal means in position therein; and FIG. 6 is a sectional view on the line 6—6 of that portion of the seal means shown in exploded view in FIG. 4.

DESCRIPTION OF THE PREFERRED EMBODIMENT

Figure 1:
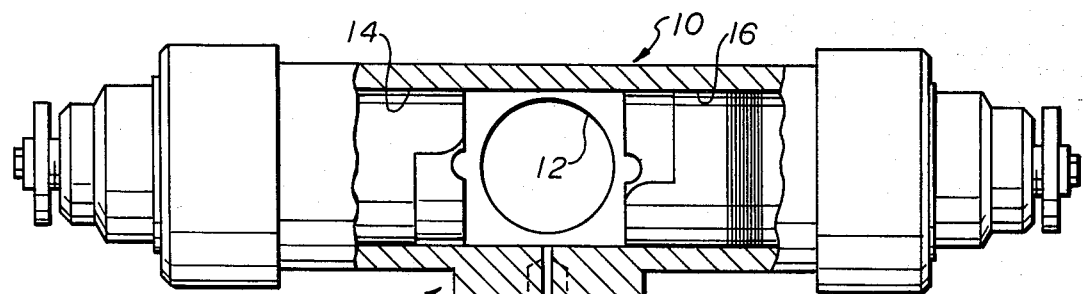
FIG. 1 is a top plan view, partly in section illustrating a form of a blowout preventer with features of the present invention.
Figure 2:
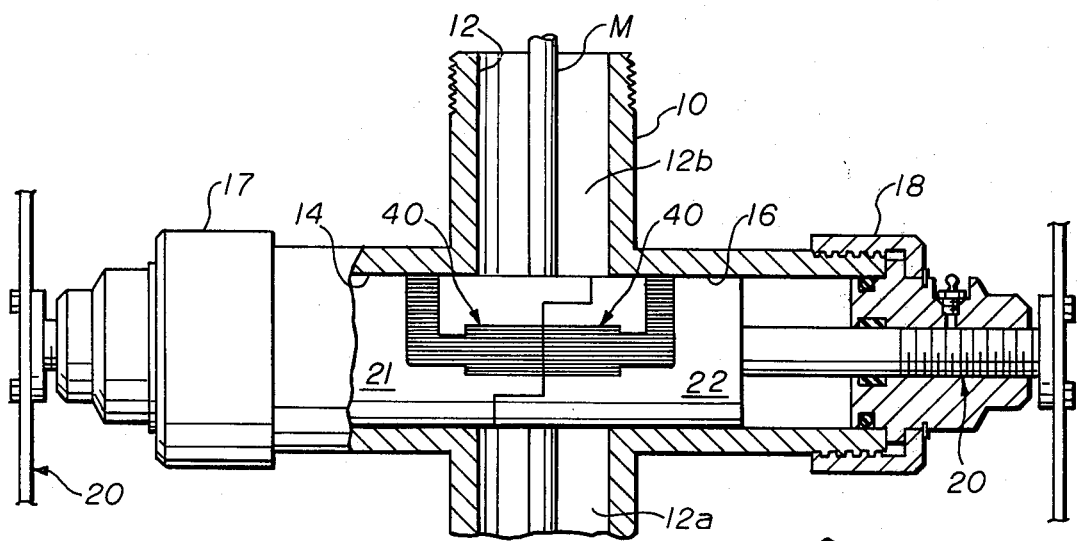
FIG. 2 is a side sectional view partly in elevation illustrating the position of the rams when moved in the transverse bores to close off communication in the longitudinal bore and seal with an elongate member therein.

Attention is first directed to FIG. 1 of the drawings wherein a blowout preventer body is illustrated generally by the numeral 10. The preventer body includes a longitudinal bore 12 with transverse bores 14 and 16 intersecting the longitudinal bore. The transverse bores 14 and 16 are closed at their outer ends by any suitable means such as that illustrated at 17 and 18 as shown in FIG. 2. Operating means referred to generally by the numeral 20 extend through each of the closure means 17 and 18 for operating or moving the preventer rams 21 and 22 within the transverse bores 14 and 16 to effect sealing with any suitable elongate member M extending in the longitudinal bore. When the rams 21, 22 are sealably engaged with a member M as shown in FIG. 2, communication is prevented between that portion of the longitudinal bore illustrated at 12a beneath the rams 21 and 22 and that portion of the longitudinal bore designated at 12b above the closed rams 21 and 22, as shown in FIG. 2 of the drawings.

The closure means 17 and 18 of the transverse bores 14 and 16 may assume any suitable form well known in the art, and in addition the operating means 20 may be either mechanical or hydraulic of any suitable form well known to those skilled in the art.

The invention is shown and described in detail with reference to its use in a wireline blowout preventer; however, such is intended only by way of example as the novel features of the invention may be incorporated in any type blowout preventer.

Attention is directed to FIG. 4 of the drawings wherein the details of the ram bodies is illustrated, one such ram body 22 being there shown. It can be appreciated that the construction of ram 21 is the same as that of ram 22 described herein in detail. The ram body 22 is a cylindrical member 24 which may be provided with any suitable arrangement such as that illustrated at 25 at its outer end for engagement with the operating means 20. The inner end 26 of each ram is provided with a longitudinal semicircular groove 27 to better enable the rams 21 and 22 to conform with the elongate member M, such as a wireline cable or the like and seal therewith when the rams 21, 22 are closed as shown in FIG. 2.

Groove means referred to generally by the numeral 30 is provided on each ram, such groove means 30 includes a portion extending diametrically across the front end 26 of each ram as illustrated at 31, another portion along each side of each ram 21 and 22 as illustrated at 32 and yet another portion which extends transversely and circumferentially over about half of each ram 21 and 22 between the side grooves 32 as illustrated at 33. Each ram 21 and 22 is provided with ram guides as illustrated generally at 35 of well known configuration which project beyond the front end 26 of each of the rams 21 and 22.

Openings or passages 36 and 37 extend through each ram 21, 22 adjacent the front end 26 and intersects the lower surface 31a of groove portion 31 extending across the front end of each of the rams 21 and 22 as shown in FIG. 4. Also, a bore 38 in each ram 21, 22 extends transversely of the openings or passages 36, 37 and intersects each of them a predetermined spaced distance from the lower surface 31a of the groove portion 31 as better seen in FIG. 5.

Seal means referred to at 40 in FIG. 2 are provided for each ram 21 and 22 for sealably engaging each ram 21, 22 with its respective transverse bore 14 and 16 which seal means also extends across the front end 26 of each of the rams 21 and 22 for sealably engaging with each other and with the elongate member or wireline M when the rams 21, 22 are closed as shown in FIG. 2 of the drawings.

More specifically, the seal means for the groove portion 31 of the groove 30 which extends diametrically across the front end 26 of each of the rams 21 and 22 is referred to generally by the numeral 45 in FIGS. 4 and 5 and includes an elastomer body 46 having the members 47, 48 embedded in the upper and lower surfaces thereof as shown in FIGS. 4 and 5. Preferably, the members 47 and 48 are substantially flat and they are of less extent than the extent of the elastomer body 46, as shown in the drawings. The seal 45 including the plates 47, 48 and the elastomer body 46 are of a size and conform to fit snugly within the groove 31 at the front end 26 at each of the rams 21, 22. It can be appreciated that the edge or side surfaces of the elastomer body 46 are suitably contoured to conform with the contour of the cylindrical ram and transverse bore within which the ram is received. Also, a semicircular groove 46a extends vertically along the front of the body 46 for sealing with wireline or Member M. The plate members 47, 48 in the embodiment illustrated in the drawings, extend substantially all the way across the upper and lower surfaces of the elastomer body 46 and are provided with recesses 47a, 48a to match groove 46a as shown in FIGS. 4 and 5. The flat, plate like members 47 and 48 are each provided with recesses 50 and 51 which are spaced longitudinally along each plate 47 and 48 as illustrated, such recesses 50 and 51 being aligned with the openings or passages 36 and 37 through each ram 21 and 22 when the seal 45 is positioned in the groove portion 31 in the groove 30 as shown in FIG. 5 of the drawings.

Suitable means such as spherical means, or ball means 55 may then be slidably inserted through each of the openings 36 and 37 to seat in the recesses 50 and 51 as shown in FIG. 5 of the drawings and the pin 38a then slidably inserted in the transverse bore 38 beneath the balls 55 as shown in FIGS. 4 and 5. As previously noted, the transverse bore 31 is spaced from the surface 31a of the groove 31 and the balls 55 are of a diameter so that when the seal 45 is positioned in the groove 31, the balls 55 will project outwardly from the recesses 50 and 51 into the openings 36 and 37 and abut against the retaining pin 38a.

From the foregoing, it can be appreciated that the passages 36, 37 transverse bore 38, pin 38a, and balls 55 function as positioning means which when positioned in each ram body 21 and 22 and in the recesses 50 and 51 of the seal 45 retain the seal means 45 including the elastomer body 46 in position in the groove portion 31 of the groove 30 during use.

A molded seal member 60 illustrated in FIG. 4 includes side portions 61 for fitting within the groove portions 32 extending along each side of the rams 21, 22 and an arcuate portion 62 which connects the portions 61 as shown, the arcuate portion 62 fitting within the groove portion 33 extending between the side grooves 32. The arcuate portion 62 is provided with a lip 63 as more clearly illustrated in FIG. 6 of the drawings to effect a more positive seal during functioning of the device.

From the foregoing, it can be appreciated that should the front seal means 45 on either ram become worn over a period of time, it can be readily and easily removed by withdrawing either or both rams from the transverse bore in which they are received by removing caps or closures 17 and 18. The pin 38a is then removed from bore 38 whereupon the balls 55 are free to dislocate so that the seal 45 can be removed. If possible, it may be reused by turning it over since recesses 50 and 51 are also provided in the upper plate, but at any event it can be readily replaced if necessary. Similarly, the molded member 60 may be readily replaced should such replacement become necessary. In addition, it can be appreciated that the needle valve disclosed herein may have applications in other fields of use and provides a floating valve seat which is responsive to pressure in a passage to form a tighter seal with a needle valve member seated thereon and reduces wear by cutting action as the valve is opened.

Figure 3:
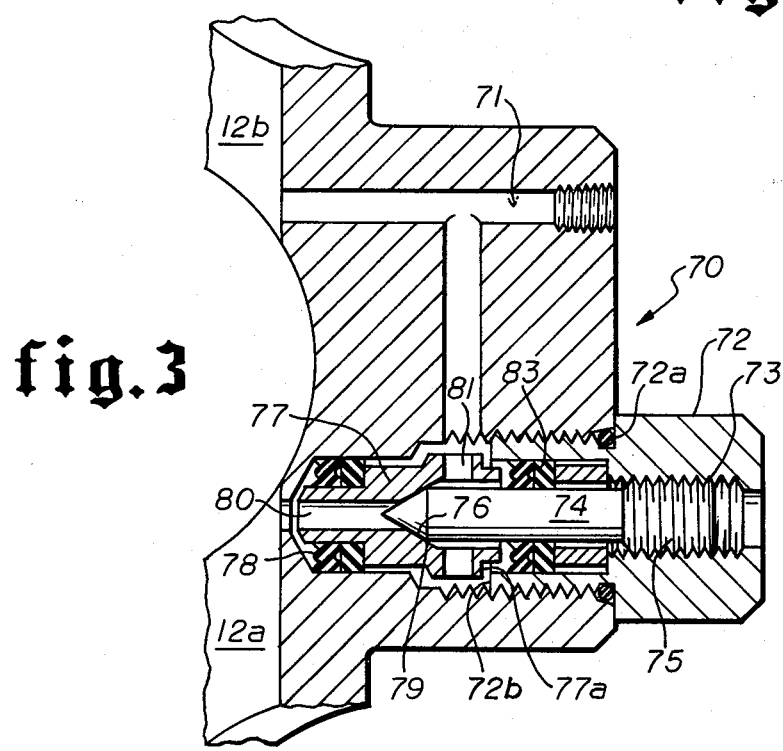
FIG. 3 is a sectional view illustrating further details of the equalizing valve means.

The preventer of the present invention also includes an equalizing arrangement illustrated generally by the numeral 70 in FIGS. 1 and 3. The equalizing means 70 includes passage means 71 which includes lateral portions for communicating the portion 12a of bore 12 beneath the rams 21 and 22 with the portion 12b of bore 12 above the rams. A bonnet 72 is threadedly connected in the body 10 of the preventer as shown in FIGS. 1 and 3 of the drawings and is provided with a threaded longitudinal passage 73 therein. A needle valve 74 is provided with threads 75 adjacent one end for threadedly engaging the threaded portion 73 and includes the tapered, annular surface 76 at the other end thereof. A valve seat 77 is received in one of the lateral portions of the passage means 71 and the valve seat is provided with seal means 78 for sealing between the valve seat 77 and the lateral portion of the passage means in which it is received. The valve seat 77 includes an annular, tapered portion 79 shaped to receive the tapered, annular closure surface 76 on valve 74 and in addition includes the passage 80 extending longitudinally therethrough with the lateral passages 81 intersecting the longitudinal passage 80 as shown in FIG. 3. The needle valve 74 is sealed within the bonnet 72 by means of the seal 83, and the bonnet 72 is sealed with the preventer body by the seals 72a.

When it is desired to close off the needle valve 74, any suitable means such as an Allen screw or the like may be engaged with a recess (not shown) in the threaded end 75 of the needle valve 74 to move the stem inwardly and seat on the surface 79 as shown in FIG. 3. It can be appreciated that any pressure within the portion 12a of the bore 12 will act on seal means 78 tending to urge the valve seat 77 in tighter engagement with the annular, tapered closure surface 76 to effect a tighter seal.

When it is desired to equalize pressure between the portions 12a and 12b of the longitudinal passage 12, before opening rams 21, 22 the stem 74 may be unthreaded to move it off the surface 79. In this connection, the valve seat 77 is provided with an annular shoulder 77a which abuts, or will engage the end 72b of the bonnet 72 to prevent engagement of the seat 77 with the packing 83 and to enable the stem 74 to be backed away from the annular surface 79 to open passage 71 between portions 12a and 12b of bore 12.

The preventer body 10 in effect provides a valve body for the needle valve 74. While the needle valve arrangement has been described in its use in relation to a blowout preventer, it can be appreciated that such needle valve arrangement may be employed in any situation where a needle valve is used. It provides advantages over other needle valves heretofore used in that the floating seat arrangement tends to eliminate wear, galling and scoring which is encountered in prior art needle valve construction. The valve seat 77 in the valve body 10 is separate from the stem and is separate from the valve body, although sealably engaged with the latter. Thus, the seat 77 may move longitudinally and rotatably relative to the body 10 while still sealably engaging therewith. Also the seat 77 is free to rotate with the stem as the needle valve 74 is rotated during opening and closing of the valve to thus reduce wear and galling.

In the form of the needle valve 74 shown, the stem terminates within bonnet 72; however it may extend through the bonnet so that a conventional valve wheel or handle can be secured thereto for rotating the valve 74.

By incorporating the equalizing means within the preventer body, external plumbing and fittings which are presently employed to accomplish such function are eliminated.

It can be appreciated from the foregoing description that the positioning means which secures the seal means 45 in each ram is operative without requiring any torque. Where screws or bolts are used, care must be employed to use sufficient torque to retain the seal in position without interferring with its sealing function. Also, if the screw or bolt becomes loose during use, it may interfere with proper sealing of the rams or cause damage during use.

More specifically bolts inside of a blowout preventer have several disadvantages, the two prime being, first, there is no means to check for correct tightness, except by disassembly; second, vibrations or incorrect tightening at assembly can cause the bolts to loosen and fall out, which may either impair operation of the blowout preventer, or even drop parts into the well, impairing operation of other mechanisms. Once the positioning means of the present invention is assembled, it can't be disturbed until the rams are removed from the preventer body.

In the present invention all parts (rubber, balls and pin) are either fully in place or not at all, and do not depend upon the judgment of the installer as to correct tightness. Once the parts are in place, they cannot come out while assembled in the blowout preventer.

With the positioning means of the present invention, these problems are eliminated. The transverse bore 38 and the pin 38a is always within the confines of the transverse bores 14 and 16 and is thus never exposed so that the pin might fall in the longitudinal bore 12a, as is the case with a bolt as used in the prior art. The bolts 55 and pin 38 are slidably received in position within the ram body, and when the preventer is removed from the transverse bore, the balls and pin may be readily removed.

Also, the lip 63 provides an arrangement so that the arcuate seal portion 62 is self energizing. For example, in prior art arrangements, force applied to the seal 45 is relied upon to expand the arcuate seal portion 62 into sealing engagement with the respective transverse bore. However, the lip 63 eliminates the necessity of relying upon such force to provide a seal as the lip 63 responds to pressure and self energizes to seal between the ram and transvese bore.

The foregoing disclosure and description of the invention are illustrative and explanatory thereof, and various changes in the size, shape, and materials as well as in the details of the illustrated construction may be made without departing from the spirit of the invention.

What is claimed is:

1. In a needle valve having a body with fluid passage means therein, the invention comprising:
    a. a valve stem rotatably and sealably carried by the body and having a tapered, annular closure surface thereon;
    b. longitudinally movable seat means in the body passage means for receiving said closure surface to close off the passage means, said seat means rotatable by said valve stem when said closure surface engages said seat means during opening and closing of the valve to reduce wear and galling between the seat means and the closure surface;
    c. seal means sealing between said seat means and passage means; and
    d. said seal means responsive to fluid pressure in the body passage means to urge said seat means longitudinally in the passage means toward said closure surface to form a tighter seal in response to pressure in the passage means in the body.

2. The invention of claim 1 including shoulder means on said seat means engageable with shoulder means formed in said body passage to limit the longitudinal movement of said seat means.

3. The invention of claim 2 wherein said shoulder means on said seat means comprise a pair of annularly extending shoulders in longitudinal spaced relation on said seat means and wherein said shoulder means formed in said body passage comprise a pair of annularly extending shoulders in longitudinal spaced relation within said body.

4. A needle valve construction for controlling flow through a passage means comprising:
    a. a body having passage means therethrough;
    b. a valve stem rotatably and sealably carried by said body and having a tapered, annular closure surface thereon;
    c. seat means for receiving said closure surface to close off the passage means, said seat means rotatable by said valve stem when said closure surface engages said seat means during opening and closing of the valve to reduce wear and galling between the seat means and the closure surface;
    d. seal means sealing between said seat means and passage means; and
    e. said seat means longitudinally movable in the passage means toward said closure surface to form a tighter seal in response to pressure in the passage means of said body.

5. The invention of claim 4 wherein said needle valve includes:
    a. bonnet means carried by said body;
    b. seal means between said body means and bonnet means; and c. means rotatably supporting said valve stem in said bonnet means.

6. The invention of claim 5 wherein said valve stem terminates within said bonnet means and is provided with means to effect rotation of said valve stem.

7. The invention of claim 5 wherein said valve stem projects through said bonnet means and is provided with means to effect rotation of said valve stem.

8. In a valve wherein a body is provided with a passage and a valve means is provided with a closure surface to control flow through the body passage, the invention comprising:
   a. longitudinally and rotatably movable seat means in the body passage for receiving the closure surface, said seat means rotatable by the valve means when the closure surface engages said seat means during opening and closing of the valve to reduce wear and galling between the seat means and the closure surface
   b. seal means sealing between said seat means and body; and
   c. said seal means responsive to fluid pressure in the body passage to urge said seat means longitudinally toward the closure surface in response to pressure in the body passage.

9. The invention of claim 8 including shoulder means on said seat means engagable with shoulder means formed in said body passage to limit the longitudinal movement of said seat means.

10. The invention of claim 9 wherein said shoulder means on said seat means comprise a pair of annularly extending shoulders in longitudinal spaced relation on said seat means and wherein said shoulder means formed in said body passage comprise a pair of annularly extending shoulders in longitudinal spaced relation within said body.

11. The invention of claim 8 wherein said valve is a needle valve.

12. The invention of claim 11 including shoulder means on said seat means engagable with shoulder means formed in said body passage to limit the longitudinal movement of said seat means.

13. The invention of claim 12 wherein said shoulder means on said seat means comprise a pair of annularly extending shoulders in longitudinal spaced relation on said seat means and wherein said shoulder means formed in said body passage comprise a pair of annularly extending shoulders in longitudinal spaced relation within said body.

* * * * *